US012755013B2

(12) United States Patent
Kondratyev et al.

(10) Patent No.: US 12,755,013 B2
(45) Date of Patent: Oct. 6, 2026

(54) DETECTING A HARMFUL FILE USING A DATABASE OF VULNERABLE DRIVERS

(71) Applicant: AO Kaspersky Lab, Moscow (RU)

(72) Inventors: Dmitry A. Kondratyev, Moscow (RU); Evgeny I. Lopatin, Moscow (RU)

(73) Assignee: AO Kaspersky Lab, Moscow (RU)

( * ) Notice: Subject to any disclaimer, the term of this patent is extended or adjusted under 35 U.S.C. 154(b) by 690 days.

(21) Appl. No.: 17/847,773

(22) Filed: Jun. 23, 2022

(65) Prior Publication Data

US 2023/0297673 A1 Sep. 21, 2023

(30) Foreign Application Priority Data

Mar. 17, 2022 (RU) ........................... RU2022107027

(51) Int. Cl.

*G06F 21/56* (2013.01)
*G06F 9/54* (2006.01)
*G06F 21/57* (2013.01)

(52) U.S. Cl.

CPC .............. *G06F 21/565* (2013.01); *G06F 9/54* (2013.01); *G06F 21/577* (2013.01); *G06F 2221/034* (2013.01)

(58) Field of Classification Search

CPC ........ G06F 21/565; G06F 9/54; G06F 21/577; G06F 2221/034

See application file for complete search history.

(56) References Cited

U.S. PATENT DOCUMENTS

| | | | | |
|---|---|---|---|---|
| 7,530,106 | B1 * | 5/2009 | Zaitsev | G06F 21/577 713/188 |
| 8,239,947 | B1 * | 8/2012 | Glick | G06F 21/52 713/153 |
| 8,549,626 | B1 * | 10/2013 | Glick | G06F 21/577 718/100 |
| 10,192,058 | B1 * | 1/2019 | Jalil | G06F 21/552 |
| 10,395,029 | B1 * | 8/2019 | Steinberg | G06F 21/53 |
| 10,929,537 | B2 * | 2/2021 | Carson | G06F 21/52 |
| 2008/0016339 | A1 * | 1/2008 | Shukla | G06F 21/54 713/164 |
| 2011/0078791 | A1 * | 3/2011 | Prakash | G06F 21/565 726/22 |
| 2012/0246722 | A1 * | 9/2012 | Boney | G06F 21/56 726/22 |
| 2015/0096028 | A1 | 4/2015 | Olshanov et al. | |
| 2016/0371484 | A1 | 12/2016 | Mehta et al. | |
| 2017/0134403 | A1 * | 5/2017 | Hearn | H04L 63/1425 |
| 2018/0351968 | A1 | 12/2018 | Macleod et al. | |

(Continued)

FOREIGN PATENT DOCUMENTS

KR 20090120717 A 11/2009

*Primary Examiner* — Shin-Hon (Eric) Chen
*Assistant Examiner* — Ethan V Vo
(74) *Attorney, Agent, or Firm* — ArentFox Schiff LLP; Michael Fainberg

(57) ABSTRACT

A method for detecting a harmful file includes detecting activity of a driver in an operating system by intercepting an Application Programming Interface (API) request from the driver to an application. The detected activity of the driver is analyzed to determine if the driver is dangerous. A search for a file that is linked to the application and that uses the driver is performed, in response to determining that the driver is dangerous. The file found by the search is declared to be harmful.

21 Claims, 3 Drawing Sheets

(56) References Cited

U.S. PATENT DOCUMENTS

| | | | | |
|---|---|---|---|---|
| 2020/0351295 | A1 * | 11/2020 | Nhlabatsi | H04L 63/205 |
| 2023/0169178 | A1 * | 6/2023 | Pande | G06F 21/562<br>726/22 |
| 2023/0214489 | A1 * | 7/2023 | Strogov | G06F 21/566<br>726/23 |

* cited by examiner

DETECTING A HARMFUL FILE USING A DATABASE OF VULNERABLE DRIVERS

CROSS REFERENCE TO RELATED APPLICATIONS

The present application claims priority to Russian Patent Application No. 2022107027, filed on Mar. 17, 2022, the entire contents of which are incorporated herein by reference.

FIELD OF TECHNOLOGY

The present invention relates generally to the field of information security and, more specifically, to detecting a harmful file using a database of vulnerable drivers.

BACKGROUND

The rapid development of computer technology together with the widespread distribution of various kinds of computing devices (personal computers, notebooks, tablets, smartphones, and the like), has strongly stimulated the use of such computing devices in various fields of activity and for an enormous number of tasks, from web browsing to bank transfers and electronic document management. This growth has been accompanied by a rapid growth in the amount of harmful files, such as malware.

For purposes of the following discussion, the term "malware" is meant to encompass applications that are destructive, propagate automatically, and/or enable unauthorized access to information. "Malware" is also meant to encompass undesirable applications and unauthorized applications. Undesirable applications include toolbars, browser helper objects, and adware. One of the emerging threats regarding the privacy and the confidentiality of digital information is Information Stealing Software, such as Trojan Horses and "Spyware". Such software may be installed on the computer by malicious users that gained an access to the user's computer or by "infection" e.g., from a web-site, an email or shared files in a file-sharing network. The information stealing software can then detect sensitive or confidential information—for example, by employing a "key logger" that logs keystrokes, or by searching for confidential information within the user's computer and sending it to a predefined destination. Other types of malware create what are known as botnets from users' devices, for attacking other computers or computer networks by "distributed denial of service (DDoS)" attacks or "brute force" attacks on passwords, for example. Yet another type of malware offers paid content to users through persistent advertising, paid subscriptions, SMS transmission to subscription numbers, and the like.

Unfortunately, existing software has become so complex and multifunctional that it has become possible for malware to use the essentially legitimate parts of such software (in the form of libraries, software modules or available Application Programming Interface (API) functions, for example) for malicious activity. For example, ransomware programs may use libraries of legitimate archivers for encrypting documents and other files of critical importance for users.

Thus, in this scenario, the operation of malware seriously complicates the operation of antivirus software, because some of the harmful activity takes place through legitimate programs which cannot be blocked or removed, as this might cause malfunctions in the work of a computer user or might lead to the loss of data important to the user. Moreover, the parts of legitimate programs mentioned above typically operate in kernel mode (as in the case of drivers, for example), which also complicates the overall control of harmful activity by antivirus software.

To provide a partial solution to the problems described above, combined methods of detecting malware may be used when the identification of harmful activity is carried out in either kernel mode or user mode, and the results of this checking are combined together and analyzed.

The known antivirus technologies perform adequately in the detection of malware operating either in an operating system's kernel mode or in user mode, while also making it possible to identify malware generated on a victim's computer by other malware. However, the known antivirus software typically performs poorly in situations where malware operates simultaneously in an operating system's kernel mode and in user mode by using legitimate components also operating in the operating system's kernel mode.

Thus, there is a need for systems to detect harmful files that use legitimate drivers (including signed drivers and drivers relating to legitimate software).

SUMMARY

Disclosed are systems and methods for harmful file using a database of vulnerable drivers.

Advantageously, the disclosed method detects a harmful file by the analysis of the operation of a driver which is contacted by an application linked to the harmful file.

Another advantage is an increase in accuracy in the detection of a harmful file by the detection and analysis of a dangerous driver using the file.

In one aspect, a method for detecting a harmful file includes detecting activity of a driver in an operating system by intercepting an Application Programming Interface (API) request from the driver to an application. The detected activity of the driver is analyzed to determine if the driver is dangerous. A search for a file that is linked to the application and that uses the driver is performed, in response to determining that the driver is dangerous. The file found by the search is declared to be harmful.

In one aspect, the activity of the driver operating in user mode in the operating system is detected using another driver operating in kernel mode.

In one aspect, the activity of the driver comprises at least one of: transmitting data over a computer network; interacting with operating system services using a call to API functions provided by the operating system; interacting with an application running in the operating system using a call to corresponding API functions provided by the application; and interacting with a file linked to the application running in the operating system using a call to the corresponding API functions provided by the application.

In one aspect, analyzing the detected activity of the driver includes determining a danger coefficient of the driver. The danger coefficient of the driver includes a numerical value.

In one aspect, the method further includes: searching for a file linked to the application that uses the driver if the danger coefficient exceeds a threshold value.

In one aspect, the numerical value ranges between a first number and a second number. The first number indicates that the driver is harmless and the second number indicates that the driver is dangerous.

In one aspect, analyzing the detected activity of the driver further includes at least one of: comparing an analyzed driver with a known driver from a dangerous drivers database; and simulating operation of the analyzed driver in a virtual environment.

In one aspect, the driver is determined to be harmful if the detected activity includes at least one of: a security vulnerability in the operation of the analyzed driver; and a potentially dangerous functionality of the driver.

In one aspect, the potentially dangerous functionality includes functionality hidden from a user and configured to affect working capacity of a computer device.

In one aspect, searching for the file further includes checking the file for harmfulness.

In one aspect, the method further includes placing the file declared to be harmful in quarantine. Placing the file in quarantine further includes at least one of: removing the file from the operating system; and removing the driver determined to be dangerous from the operating system.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product detecting a harmful file. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
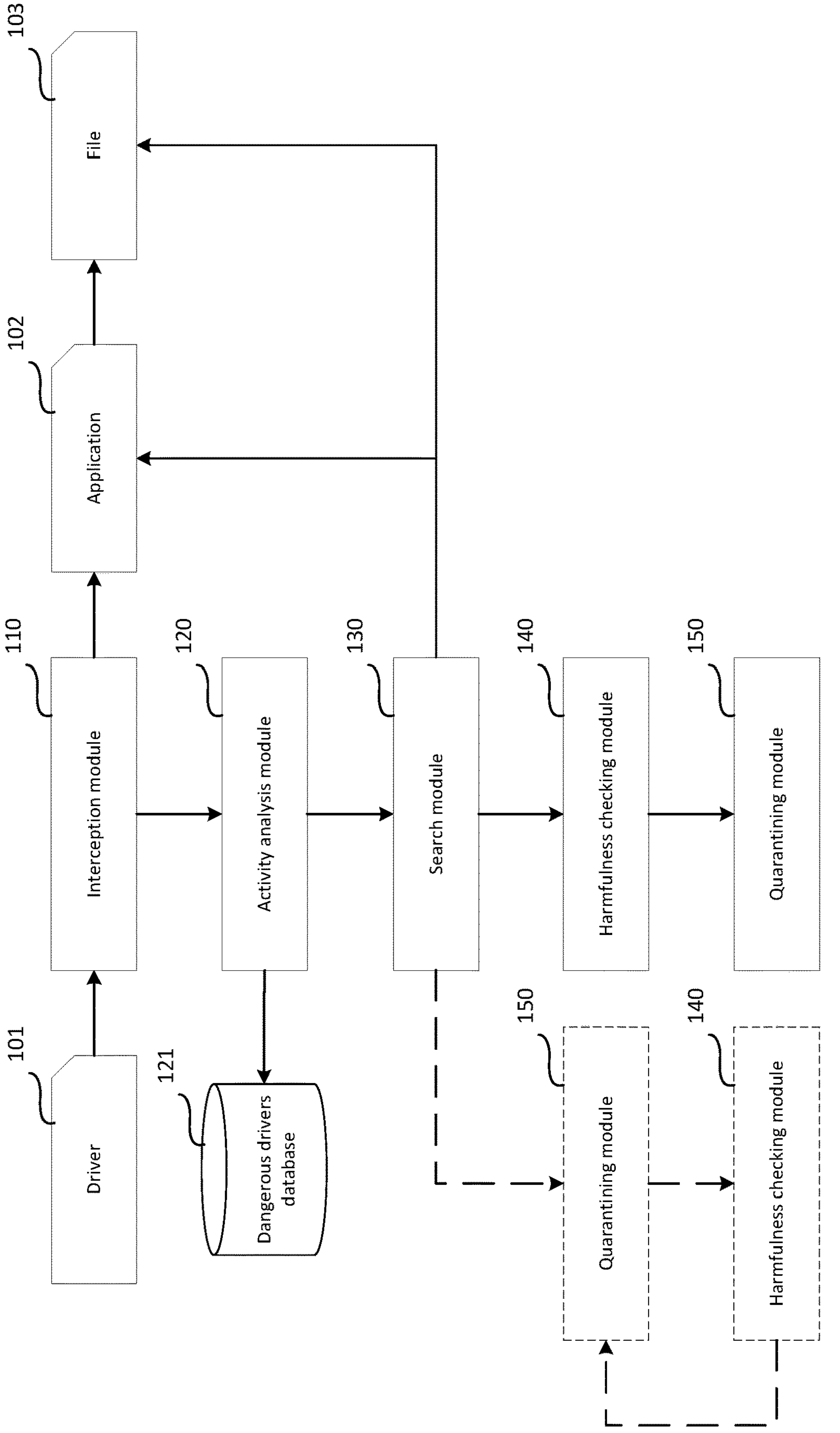
FIG. 1 illustrates an example architecture of a system for detecting a harmful file, in accordance with aspects of the present disclosure.

FIG. 1 illustrates an example architecture of a system for detecting a harmful file.

In an aspect, the system for detecting a harmful file may include an interception module 110, an activity analysis module 120, a dangerous driver database 121, a search module 130, a harmfulness checking module 140, and a quarantining module 150.

The modules described below may be implemented as elements of a computer system or of a combination of computer systems, depicted in greater detail in FIG. 3.

The interception module 110 may be configured to detect the activity of a driver 101 in an operating system by intercepting an API request sent from the driver 101 to an application 102.

In an aspect, the interception module 110 may be configured to detect the activity of a driver 101 operating in user mode, with the aid of another driver operating in kernel mode.

For example, the system described herein may be a part of antivirus software, one of whose components is a driver operating in kernel mode and intercepting API calls between various objects of the operating system (operating system services, applications, libraries, other drivers, and the like).

In another aspect, the interception module 110 may be configured to track the activity of drivers 101 that meet the following criteria:

- the driver is legitimate (i.e. the driver is authorized and has a validated digital signature, or is installed in the operating system as a result of the installation of legitimate software);
- the driver is not secure or is not known for the system described (particularly in the case of antivirus software used for checking drivers) (i.e. it has already been established that the driver is dangerous or potentially dangerous, or such a check has not been made and the driver continues to have an unspecified status).

For example, there may be legitimate drivers included in software developed by legitimate producers and intended to execute actions that are safe for the user. However, these legitimate drivers may contain vulnerabilities, or may have a functionality that malicious parties may use in harmful software to generate dangerous actions, including, but not limited to, actions from the kernel of the operating system. Such drivers may be tracked by the interception module 110.

In yet another aspect, the interception module 110 may be configured to track the activity of drivers 101 in respect of which, at least,

- it is known that they have been used previously by malware for harmful activity (not necessarily affecting the user of the system described);
- it has been established that the drivers may be used by harmful software (because they have vulnerabilities or provide functionality that can be used in harmful activity, or the like).

For example, only the drivers 101 in the operating system that exchange data with applications over a network while bypassing a network gateway (because they are on a list of exceptions, for example), may be tracked.

In another aspect, the activity of the driver 101 may include at least the following:

- transmitting data over a computer network;
- interacting with operating system services, including via a call to API functions provided by the operating system;
- interacting with an application 102 running in the operating system, including via a call to corresponding API functions provided by the application 102;
- interacting with files or a file structure, including interacting with the file 103, linked to the application 102 running in the operating system, including via a call to the corresponding API functions provided by the application 102.

In one aspect, the system described may be used for situations in which the driver 101 is linked to a number of applications 102, where each application 102 may in turn be linked to a number of files 103.

For example, when working with a file archiving driver 101, two applications 102 may be found, namely, a certified archiver widely used by users and a less popular application. The certified archiver and the little-used application that are found may both be directly linked to a number of files, and in the case of the certified archiver it is possible that all the files may be trusted (i.e. validated and proven to have no harmful functionality). In the case of the little-used application, some of the files may include harmful functionality found in the course of an antivirus analysis.

Accordingly, the system illustrated in FIG. 1 for detecting a harmful file 103 linked to the application 102 may also detect harmful files 103 linked to a number of applications 102 (it is possible, but not essential, for one file 103 to be linked to a number of applications 102).

The activity analysis module 120 may be configured to determine, based on an analysis of the activity of the driver 101, whether the driver 101 is dangerous. In other words, the activity analysis module 120 may determine whether the driver 101 may be used by harmful software for harmful activity.

In one aspect, the activity analysis module 120 may be configured to determine a danger coefficient of a driver as a result of the driver activity analysis 101. In an aspect, the danger coefficient of the driver may be a numerical value within a range, one boundary of the range signifying a substantially harmless driver, while the other boundary of the range signifies a driver that is highly likely to be usable for damaging a computer device.

For example, the danger coefficient may be within the range from 0 to 1, and its calculation may be based on weights assigned to each type of activity. In this example, any value of the danger coefficient close to 0 would indicate that the corresponding driver is substantially harmless, while any value of the coefficient near 1 would indicate that the corresponding driver is highly likely to be used for damaging activities. The driver (or any other software component) may work with files, different memory areas, network traffic, and the like. Each of these aspects of the activity may be assigned a different weight. If the driver accesses a file for reading purposes only, then the danger coefficient may be set to values between 0 to 0.2 depending on where the file is located. In one non-limiting example, if the accessed file is located in the temporary folder, the danger coefficient may be 0, if the accessed file is located in the application folder, the danger coefficient may be 0.1, if the accessed file is located in the system folder, the danger coefficient may be 0.2. Similarly, age of the accessed file may affect the assigned danger coefficient. For example, the danger coefficient may be equal to 0.1, 0.15 and 0.2 for files created in the last 24 hours, in the last week and in the last year, respectively. Other factors that may influence the danger coefficient may include, but are not limited to, which applications also use the file, what actions are performed on the file (reading, writing), and the like.

Similarly, when a driver is working with memory or network traffic the value of the danger coefficient may depend on which process owns the memory, what actions are performed on the memory, and the like.

In general, since the danger coefficient characterizes some probabilistic estimate, then the calculation of the final danger coefficient may be performed on probabilistic calculations (e.g., the rules of addition or multiplication of probabilities). Also, when computing the danger coefficient, both the entropy of data (files, memory, network traffic) and the entropy of the sequence of commands when working with the specified data can be taken into account.

In a further example, a trained model may be used to calculate the danger coefficient.

In yet another aspect, the analysis of the activity of the driver 101 comprises at least one of:

- identifying a driver 101 to be compared with a known driver from the dangerous drivers database 121;
- simulating the operation of the driver 101 to be analyzed in a virtual environment.

The result of the analysis of the activity of the driver 101 may include the recognition of the driver 101 to be analyzed as either harmless or dangerous.

In yet another aspect, the analysis of the activity of the driver 101 may consist of the simulation of driver's operation. For this purpose, any known method may be used in the described system to implement a virtual environment simulating the operation of the computer system in which the driver 101 is installed. Various scenarios for the use of the driver 101 may be executed in the virtual environment, without any damage to the real computer system. The results of the execution of the various scenarios may be used to determine whether or not the driver 101 is dangerous.

The dangerous drivers database 121 may include at least one of the following:

- drivers recognized as dangerous;
- metadata describing the drivers recognized as dangerous;
- parts of the code of the drivers containing vulnerabilities;
- metadata describing the code of the drivers containing vulnerabilities.

In yet another aspect, a driver may be recognized as dangerous if, at least one of:

- the driver has already been recognized by the activity analysis module 120 as a dangerous driver that may be used by malware for a harmful activity (for example, the driver may contain vulnerabilities allowing it to be used by third-party programs, or the driver's functionality has had a "dual" purpose from the outset, and may therefore be used for a harmful activity (in a particular case, the corresponding drivers may be responsible for encrypting data));
- the driver has already been used by malware for a harmful activity (either on the computer on which the described system operates, or on any other computer, if the dangerous drivers database 121 has been created in advance based on statistics collected on the operation of known drivers);
- the driver has already been analyzed by any known method and recognized as being usable by malware for harmful activity.

In general, various types of vulnerabilities are well known in the art and may be either associated with errors in the operation of the operating system API or some library, errors in the operation of the hardware itself, or errors in the implementation of the algorithms of the corresponding software. Such vulnerabilities may include, but are not limited to, buffer overflow, heap overflow, stack overflow, error per unit, heap spraying, memory access security violations (e.g., buffer overflows, hanging pointers), input validation errors (e.g., format string errors, incorrect support for interpreting shell metacharacters, SQL injection, code injection, email Injection, directory traversal, cross site scripting in web applications, cross-site scripting with SQL injection), race conditions (e.g., time of checking-to-time-of-use errors, symbolic link races), privilege confusion errors (e.g., cross-site request forgery in web applications), privilege escalation (e.g., shatter attack, zero day vulnerability), and the like.

In yet another aspect, the metadata describing the drivers recognized to be dangerous may include at least one of:

- parameters for identifying a driver (either unambiguously or with a specified certainty), such as, but not limited to: the size of the driver file, the file name, the creation date, digests of the driver code, API functions used, or the like;
- parameters describing the behavior of the driver, such as, but not limited to: API functions provided by the driver, actions of the driver leading to modifications in the operating system, or the like;

parameters describing the driver environment, such as, but not limited to: the software used by the driver, the driver installation software, or the like.

In yet another aspect, the driver 101 may be recognized as dangerous if the analysis has detected, at least one of:

a security vulnerability in the operation of the driver 101;

a potentially dangerous functionality of the driver 101.

Potentially dangerous (malicious) functionality may include a functionality that an attacker may use for malicious activity and which, for one reason or another (for example, lack of rights or the complexity of algorithms) may not be implemented by users themselves. For example, archivers have potentially malicious functionality, since they may allow encryption of files with passwords (i.e., they enable blocking user access to data), or legal remote administration programs. Even if a program (driver) enables modification or deletion of files and provides access to its functionality to other programs, or this functionality can be obtained, then the program (driver) may be recognized as having potentially malicious functionality. On the other hand, if a program, say, can change a particular file, but without changing the software code there is no way to force the program/driver to change other files, then such functionality should not be recognized as potentially malicious functionality. In summary, any functionality related to modifying arbitrary files, injections into other processes (which is sometimes required in the work of various utilities), interceptions of calls to API functions and logging of API functions work are non-limiting examples of potentially malicious functionality.

In yet another aspect, various corresponding weights may be assigned to the various security vulnerabilities in the operation of the driver 101 or to potentially dangerous functions of the driver 101; in addition, the activity analysis module 120 may calculate the overall danger coefficient of the driver 101 based on the assigned weights.

In yet another aspect, a potentially dangerous functionality may be a functionality that may be used in concealment from the user and that may damage the working capacity of computer equipment.

The search module 130 may be configured for searching for a file 103 linked to the application 102 using the driver 101.

In yet another aspect, the file 103 may be linked to the application 102 if, at least one of:

the application 102 uses the file 103 in its operation;

the file 103 was created during the running of the application 102;

the file 103 was used in the launch of the application 102.

In yet another aspect, if the danger coefficient of the driver 101, calculated by the activity analysis module 120, exceeds a threshold value, a search may be made for the file 103 linked to the application 102 that uses the driver 101.

The harmfulness checking module 140 may be configured for:

checking the found file 103 for harmfulness;

recognizing the found file 103 as harmful.

In an aspect, the harmfulness checking module 140 may be configured to recognize the file 103 as harmful as a result of antivirus checking and making a decision about the harmfulness of the file 103 based on the identification of the driver 101 as dangerous.

In yet another aspect, the harmfulness checking module 140 may include antivirus software.

The quarantining module 150 may be configured to place at least one of the driver 101, the application 102 or the file 103 in quarantine.

In an aspect, the object placed in quarantine is isolated while in quarantine. Furthermore, during quarantine process at least one of the following actions may be executed by the quarantining module 150:

removing the found file 103 from the operating system;

removing the dangerous driver 101 from the operating system;

removing the application 102 linked to the found file 103 from the operating system;

blocking at least one of: the dangerous driver 101, the application 102 linked to the found file 103, and the found file 103.

In yet another aspect, the quarantining module 150 may include antivirus software.

In an aspect, the operating procedure for detecting a harmful file is executed as follows:

After the search module 130 has found a file 103 linked to the application 102 using the driver 101, the file is recognized as suspect (potentially dangerous) and the quarantining module 150 places the file 103 in quarantine.

The harmfulness checking module 140 may then be used to check the found file 103, placed in quarantine, for harmfulness.

If the file 103 is recognized as harmful, the quarantining module 150 may remove the file 103 from the operating system.

In yet another aspect, similar actions may be taken by the quarantining module 150 in respect of, at least:

the application 102 linked to the file 103;

the driver 101 using the application 102.

Figure 2:
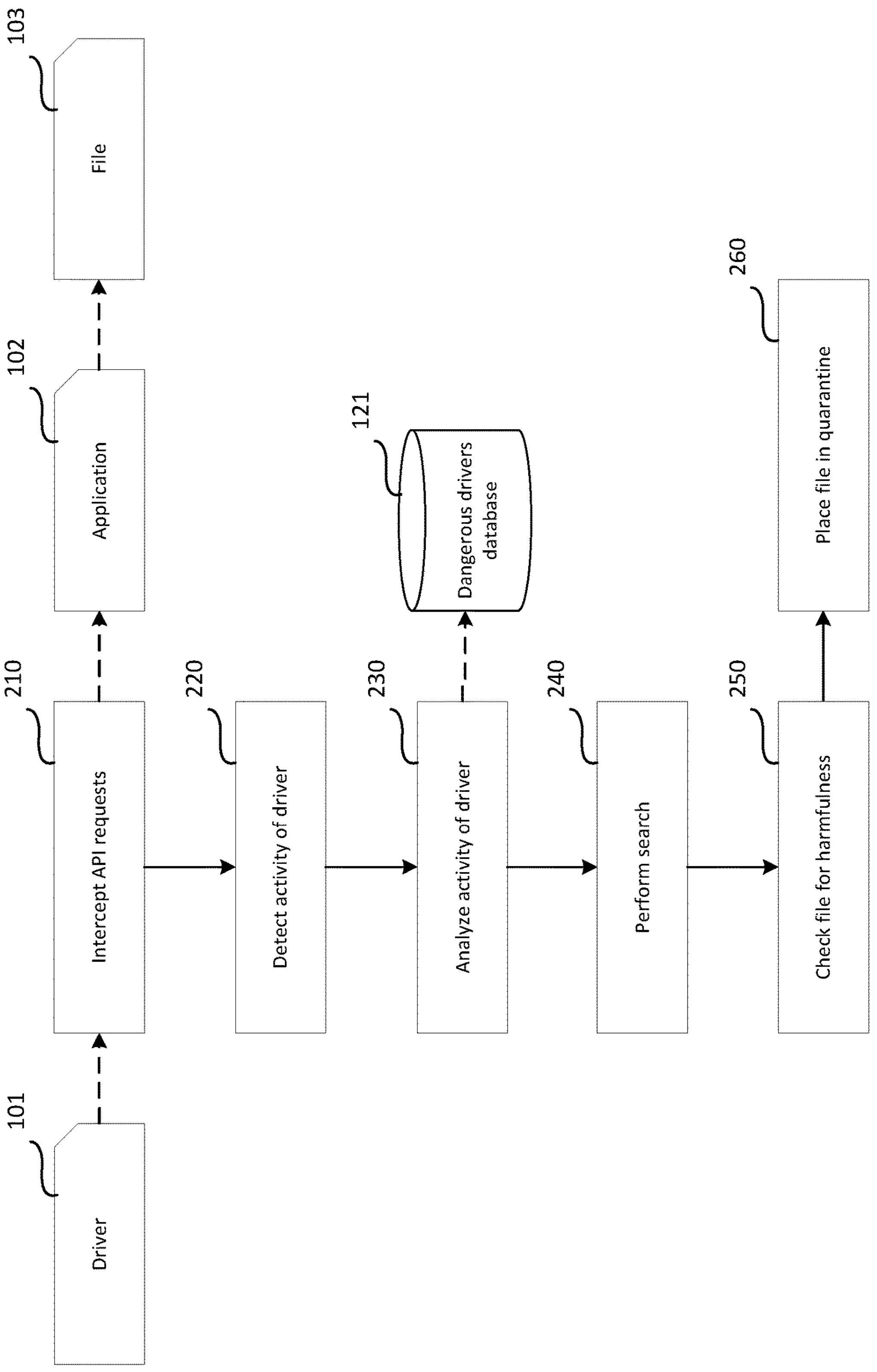
FIG. 2 is a flowchart illustrating an example method for detecting a harmful file, in accordance with aspects of the present disclosure.

FIG. 2 is a flowchart illustrating an example method for detecting a harmful file, in accordance with aspects of the present disclosure.

In an aspect, the method for detecting a harmful file may include a step 210 in which API requests are intercepted, a step 220 in which the activity of a driver is detected, a step 230 in which the activity of the driver is analyzed, a step 240 in which a search is for a file is performed, a step 250 in which the file is checked for harmfulness, and a step 260 in which the file is placed in quarantine.

The method for detecting a harmful file is executed using a processor and a memory and is described in greater detail in FIG. 1.

In an aspect, at step 210, the interception module 110 may intercept an API request from the driver 101 to an application 102. For example, the interception module 110 may be configured to intercept API calls between various objects of the operating system.

At step 220, the interception module 110 may detect the activity of the driver 101 in the operating system, based on the interception of an API request performed in step 210.

In an aspect, in step 220 the interception module 110 may detect the activity of a driver 101 operating in user mode using another driver operating in kernel mode.

In an aspect, the activity of the driver 101 may comprise at least the following:

transmitting data over a computer network;

interacting with operating system services, including, but not limited to, a call to API functions provided by the operating system;

interacting with an application 102 running in the operating system, including, but not limited to, a call to corresponding API functions provided by the application 102;

interacting with files or a file structure, including interacting with the file 103 linked to the application 102 running in the operating system, including, but not limited to, a call to the corresponding API functions provided by the application 102.

In an aspect, at step 230, the activity analysis module 120 may determine, based on the analysis of the interception module 110 in step 220, whether the driver 101 is dangerous.

In an aspect, the activity analysis module 120 may calculate the danger coefficient of a driver based on a result of the analysis of the activity of the driver 101. In an aspect, if the danger coefficient calculated by the activity analysis module 120 exceeds a threshold value, the search module 130 may perform a search for a file 103 linked to an application 102 that uses the driver 101. In an aspect, the danger coefficient of the driver may be a numerical value within a range, wherein one of the boundaries of such range may signify a driver that is substantially harmless, while the other boundary of the range may signify a driver that is highly likely to be usable for damaging the corresponding computer device.

In an aspect, the analysis of the activity of the driver 101 may include at least one of:

- identifying a driver 101 to be compared with a known driver from the dangerous drivers database 121;
- simulating the operation of the driver 101 to be analyzed in a virtual environment.

In an aspect, the result of the analysis may be the recognition of the driver 101 to be analyzed as harmless or dangerous.

In an aspect, the harmfulness checking module 140 may declare the driver 101 as dangerous (see step 250 below) if the analysis has detected, at least one of:

- a security vulnerability in the operation of the driver 101;
- a potentially dangerous functionality of the driver 101.

In an aspect, a potentially dangerous functionality may be a functionality that may be used in concealment from the user and may affect the working capacity of a computer device.

In an aspect, at step 240, in response to the driver 101 being recognized as dangerous based on the analysis performed in step 230, the search module 130 may search for a file 103 linked to the application 102 that uses the driver 101.

In an aspect, at step 250, the harmfulness checking module 140 may recognize the file 103 as harmful.

In one aspect, the found file 103 may be recognized as harmful by the harmfulness checking module 140, based on antivirus checking. In an aspect, the harmfulness checking module 140 may make a decision about the harmfulness of the file 103 based on the identification of the driver 101 as dangerous.

In yet another aspect, the harmfulness checking module 140 may assign a higher danger coefficient to the file 103 if it is used by a dangerous driver 101, as compared to a file 103 that is used by a secure driver.

In this case, such suspect files may be detected, thereby increasing the accuracy of the detection of harmful files.

In yet another aspect, after the search module 130 completes the search for a file 103 linked to the application 102 using the driver 101, the harmfulness checking module 140 may perform a further check of the found file 103 for harmfulness.

In an aspect, at step 260, if the found file 103 is recognized as harmful, the quarantining module 150 may place at least one of the driver 101, the application 102 or the file 103 in quarantine.

In one aspect, the object placed in quarantine is isolated from other objects while in quarantine by the quarantining module 150. In an aspect, during the quarantine, the quarantining module 150 may perform at least one of the following actions: removing the found file 103 from the operating system;

- removing the dangerous driver 101 from the operating system;
- removing the application 102 linked to the found file 103 from the operating system;
- blocking at least one of the dangerous driver 101, the application 102 linked to the found file 103, and the found file 103.

Figure 3:
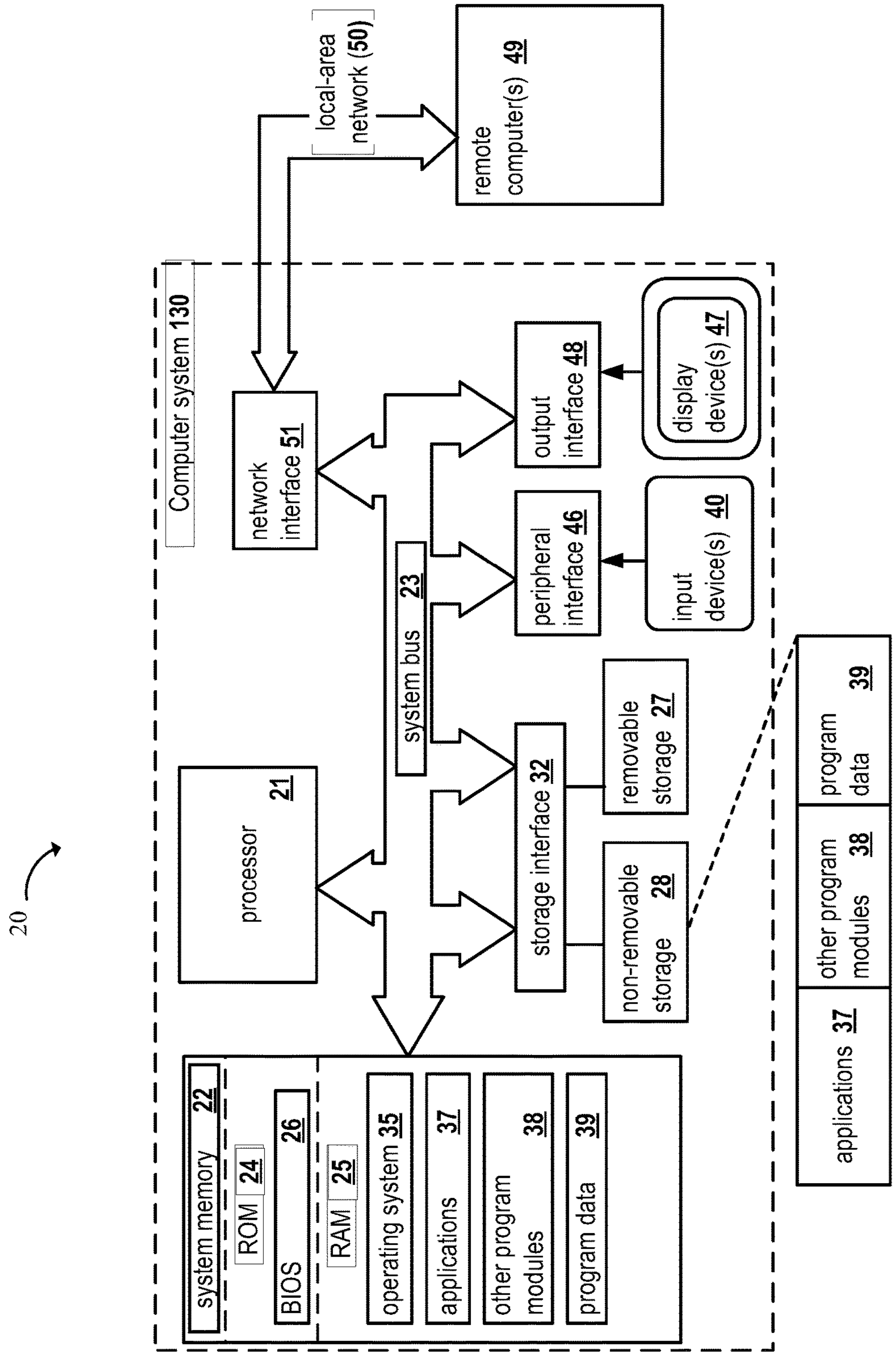
FIG. 3 shows an example of a computer system on which variant aspects of systems and methods disclosed herein may be implemented.

FIG. 3 shows an example of a computer system on which variant aspects of systems and methods disclosed herein may be implemented. The computer system 20 may represent the system for detecting a harmful file of FIG. 1 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting a harmful file, the method comprising:

detecting an activity of a driver operating in a user mode in an operating system by intercepting an Application Programming Interface (API) request from the driver operating in the user mode to an application using another driver operating in kernel mode;

analyzing the detected activity of the driver operating in the user mode to determine if the driver operating in the user mode is dangerous or harmless, wherein analyzing the detected activity of the driver operating in the user mode comprises determining a danger coefficient of the driver by assigning weighted values to a plurality of observed driver activities;

searching for a file that is linked to the application and that uses the driver operating in the user mode, in response to determining that the driver operating in the user mode is dangerous based on the danger coefficient of the driver exceeding a threshold value;

checking the file found by the search for harmfulness, wherein checking the file for harmfulness comprises assigning a higher danger coefficient to the file if it is used by a dangerous driver, as compared to a file that is used by a secure driver; and declaring the file found by the search as harmful based at least on the danger coefficient assigned to the file.

2. The method of claim 1, wherein the activity of the driver operating in the user mode comprises at least one of:

transmitting data over a computer network;

interacting with operating system services using a call to API functions provided by the operating system;

interacting with an application running in the operating system using a call to corresponding API functions provided by the application; and interacting with a file linked to the application running in the operating system using a call to the corresponding API functions provided by the application.

3. The method of claim 1, wherein the danger coefficient of the driver comprises a numerical value indicative of a probabilistic estimate of the driver operating in the user mode being dangerous.

4. The method of claim 3, wherein the numerical value ranges between a first number and a second number and wherein the first number indicates that the driver operating in the user mode is harmless and the second number indicates that the driver operating in the user mode is dangerous.

5. The method of claim 1, wherein analyzing the detected activity of the driver operating in the user mode further comprises at least one of: comparing an analyzed driver operating in the user mode with a known driver from a dangerous drivers database; and simulating operation of the analyzed driver operating in the user mode in a virtual environment.

6. The method of claim 1, wherein the driver operating in the user mode is determined to be harmful if the detected activity includes at least one of:

a security vulnerability in the operation of the analyzed driver; and a potentially dangerous functionality of the driver operating in the user mode.

7. The method of claim 6, wherein the potentially dangerous functionality comprises functionality hidden from a user and configured to affect working capacity of a computer device.

8. The method of claim 1, wherein the weighted values are assigned to the plurality of observed driver activities based on one or more of: a type of a file accessed by the driver operating in the user mode, a type of access of the file, an age of the file, and an entropy of data or command sequences associated with the driver operating in the user mode.

9. The method of claim 1, wherein determining the danger coefficient of the driver further comprises:

determining if the driver accesses a file for reading;

determining the location of the accessed file; and setting the danger coefficient of the driver depending on where the accessed file is located, wherein a lower danger coefficient is assigned if the accessed file is located in an application folder and a higher danger coefficient is assigned if the accessed file is located in a system folder.

10. The method of claim 1, further comprising placing the file declared to be harmful in quarantine, wherein placing the file in quarantine further comprises removing an application linked to the found file from the operating system.

11. The method of claim 1, wherein analyzing the detected activity of the driver to determine if the driver is dangerous comprises recognizing the driver as dangerous if the driver's functionality has had a dual purpose from the outset, wherein the corresponding drivers are responsible for encrypting data.

12. A system for detecting a harmful file, the system comprising:

a memory and a hardware processor configured to:

detect an activity of a driver operating in a user mode in an operating system by intercepting an Application Programming Interface (API) request from the driver operating in the user mode to an application using another driver operating in kernel mode;

analyze the detected activity of the driver operating in the user mode to determine if the driver operating in the user mode is dangerous or harmless, wherein analyzing the detected activity of the driver operating in the user mode comprises determining a danger coefficient of the driver by assigning weighted values to a plurality of observed driver activities;

search for a file that is linked to the application and that uses the driver operating in the user mode, in response to determining that the driver operating in the user mode is dangerous based on the danger coefficient of the driver exceeding a threshold value;

check the file found by the search for harmfulness, wherein checking the file for harmfulness comprises assigning a higher danger coefficient to the file if it is used by a dangerous driver, as compared to a file that is used by a secure driver; and declare the file found by the search as harmful based at least on the danger coefficient assigned to the file.

13. The system of claim 12, wherein determining the danger coefficient of the driver further comprises:

determining if the driver accesses a file for reading;

determining the location of the accessed file; and setting the danger coefficient of the driver depending on where the accessed file is located, wherein a lower danger coefficient is assigned if the accessed file is located in an application folder and a higher danger coefficient is assigned if the accessed file is located in a system folder.

14. The system of claim 12, wherein the activity of the driver operating in the user mode comprises at least one of:

transmitting data over a computer network;

interacting with operating system services using a call to API functions provided by the operating system;

interacting with an application running in the operating system using a call to corresponding API functions provided by the application; and interacting with a file linked to the application running in the operating system using a call to the corresponding API functions provided by the application.

15. The system of claim 12, wherein the danger coefficient of the driver operating in the user mode comprises a numerical value indicative of a probabilistic estimate of the driver operating in the user mode being dangerous.

16. The system of claim 15, wherein the numerical value ranges between a first number and a second number and wherein the first number indicates that the driver operating in the user mode is harmless and the second number indicates that the driver operating in the user mode is dangerous.

17. The system of claim 12, wherein the hardware processor configured to analyze the detected activity of the driver operating in the user mode is further configured to at least one of: compare an analyzed driver operating in the user mode with a known driver from a dangerous drivers database; and simulate operation of the analyzed driver operating in the user mode in a virtual environment.

18. The system of claim 12, wherein the hardware processor further configured to place the file declared to be harmful in quarantine, wherein placing the file in quarantine further comprises removing an application linked to the found file from the operating system.

19. The system of claim 12, wherein analyzing the detected activity of the driver to determine if the driver is dangerous comprises recognizing the driver as dangerous if the driver's functionality has had a dual purpose from the outset, wherein the corresponding drivers are responsible for encrypting data.

20. The system of claim 12, wherein the driver operating in the user mode is determined to be harmful if the detected activity includes at least one of:

a security vulnerability in the operation of the analyzed driver; and a potentially dangerous functionality of the driver operating in the user mode.

21. A non-transitory computer readable medium storing thereon computer executable instructions for detecting a harmful file, including instructions for:

detecting an activity of a driver operating in a user mode in an operating system by intercepting an Application Programming Interface (API) request from the driver operating in the user mode to an application using another driver operating in kernel mode;

analyzing the detected activity of the driver operating in the user mode to determine if the driver operating in the user mode is dangerous or harmless, wherein analyzing the detected activity of the driver operating in the user mode comprises determining a danger coefficient of the driver by assigning weighted values to a plurality of observed driver activities;

searching for a file that is linked to the application and that uses the driver operating in the user mode, in response to determining that the driver operating in the user mode is dangerous based on the danger coefficient of the driver exceeding a threshold value;

checking the file found by the search for harmfulness, wherein checking the file for harmfulness comprises assigning a higher danger coefficient to the file if it is used by a dangerous driver, as compared to a file that is used by a secure driver; and declaring the file found by the search as harmful based at least on the danger coefficient assigned to the file.

* * * * *